US009922257B2

(12) United States Patent
Teller et al.

(10) Patent No.: US 9,922,257 B2
(45) Date of Patent: Mar. 20, 2018

(54) IMAGE AUDITING METHOD AND SYSTEM

(71) Applicants: David Teller, Miami, FL (US);
Geovanny Tejeda, The Hague (NL)

(72) Inventors: David Teller, Miami, FL (US);
Geovanny Tejeda, The Hague (NL)

(73) Assignee: Glimpse Group LLC, Miami, FL (US)

( * ) Notice: Subject to any disclaimer, the term of this patent is extended or adjusted under 35 U.S.C. 154(b) by 269 days.

(21) Appl. No.: 14/867,248

(22) Filed: Sep. 28, 2015

(65) Prior Publication Data

US 2016/0092740 A1    Mar. 31, 2016

Related U.S. Application Data

(60) Provisional application No. 62/071,578, filed on Sep. 29, 2014.

(51) Int. Cl.
| G06Q 20/00 | (2012.01) |
| G06K 9/00 | (2006.01) |
| G06K 9/62 | (2006.01) |
| G06Q 20/20 | (2012.01) |
| H04N 5/77 | (2006.01) |
| G06Q 20/38 | (2012.01) |

(52) U.S. Cl.
CPC ....... G06K 9/00771 (2013.01); G06K 9/6202 (2013.01); G06Q 20/20 (2013.01); G06Q 20/206 (2013.01); G06Q 20/382 (2013.01); H04N 5/77 (2013.01)

(58) Field of Classification Search
CPC ............................ G06Q 20/209; G06K 9/6202
USPC ........................................................ 348/150
See application file for complete search history.

(56) References Cited

U.S. PATENT DOCUMENTS

| 4,961,533 A | 10/1990 | Teller et al. |
| 5,387,766 A | 2/1995 | Teller et al. |
| 6,454,162 B1 | 9/2002 | Teller |
| 6,504,481 B2 | 1/2003 | Teller |
| 7,196,624 B2 | 3/2007 | Teller |
| 7,202,780 B2 | 4/2007 | Teller |
| 7,265,673 B2 | 9/2007 | Teller |
| D561,618 S | 2/2008 | Teller |
| 7,750,817 B2 | 7/2010 | Teller |
| 7,768,396 B2 | 8/2010 | Teller |

(Continued)

FOREIGN PATENT DOCUMENTS

WO     2011/141437 A1     11/2011

OTHER PUBLICATIONS

International Search Report and the Written Opinion of the International Searching Authority dated Nov. 17, 2016, in connection with corresponding International Application No. PCT/US2016/052747 (11 pgs.).

*Primary Examiner* — Jeffery Williams
(74) *Attorney, Agent, or Firm* — Maier & Maier, PLLC

(57) ABSTRACT

An image auditing method and system may be provided. Video surveillance equipment may be operated in coordination with at least one digital computer across network architecture. The video surveillance equipment may provide a computer with footage of a transactions occurring in a target area. The footage may be filtered into at least one image of a transaction. The image may be categorized based on at least one transaction characteristic. The transaction data may be compared to transaction records from a point of sale and analyzed for any discrepancies.

11 Claims, 10 Drawing Sheets

(56) References Cited

U.S. PATENT DOCUMENTS

| | | | |
|---|---|---|---|
| 7,806,316 B1 * | 10/2010 | Torres | G07F 19/20 235/379 |
| 8,164,454 B2 | 4/2012 | Teller | |
| 2002/0070861 A1 | 6/2002 | Teller | |
| 2003/0071725 A1 | 4/2003 | Teller | |
| 2003/0098910 A1 | 5/2003 | Kim | |
| 2005/0200490 A1 | 9/2005 | Teller | |
| 2005/0237213 A1 | 10/2005 | Teller | |
| 2006/0238346 A1 | 10/2006 | Teller | |
| 2007/0146154 A1 | 6/2007 | Teller | |
| 2011/0191195 A1 * | 8/2011 | Lipton | G06Q 20/20 705/16 |
| 2012/0113121 A1 | 5/2012 | Luo et al. | |
| 2014/0214568 A1 | 7/2014 | Argue et al. | |

* cited by examiner

IMAGE AUDITING METHOD AND SYSTEM

CROSS-REFERENCE TO RELATED APPLICATIONS

This application claims priority to U.S. Provisional Patent Application No. 62/071,578 filed Sep. 29, 2014, and entitled Video analytics for loss control, the entire contents of which are hereby incorporated by reference.

BACKGROUND

The point of sale may be the time and place where a retail transaction is completed, cancelled, or partially completed. A point of sale terminal may be a device that records, organizes, and implements the relevant transaction data of a specific point of sale. Point of sale devices may utilize customized hardware and software tailored to a specific requirement and purpose. One example may be the early electronic cash registers at restaurants in the 1970's that may have allowed employees to input a customer's order by numeric keys while displaying the customer order on a display device for verification and feedback. Modern systems have improved upon the basic foundational building blocks of point of sale terminals to offer additional customizations and features. Modern point of sale devices may be enhanced by bar code readers, pin pad displays, and reporting features. Point of sale devices have greatly improved the accounting and inventory record keeping of retail businesses.

Video surveillance may be the use of video cameras to transmit a video recording to a specific location or to store video surveillance footage in a specific location. Video Surveillance Equipment may have historically consisted of cameras physically linked via hard cables to transmit video recordings to recording devices, display devices, or both. Video surveillance may often be employed when human surveillance is not feasible. Video surveillance may have been used in retail stores to monitor customer and employee activities.

Cloud computing may be a form of information technology management consisting of a client side computing device, a server side computing device, and a network architecture that allows the client and server side computing devices to communicate. A client side computing device may access a software platform hosted by the server side computing device across a web-browser. The software platform may be accessed on demand as software as a service licensing and delivery model in which the software is licensed on a subscription basis and is centrally hosted by the server side computing device.

Presently, there may exist a desire for a practical application of video surveillance technology, and cloud computing technologies, to be applied at a point of sale. The combination of these technologies may substantially improve reporting of sales and inventory.

SUMMARY

According to an exemplary embodiment, a method of auditing transactions with video surveillance may be provided. The method may include providing video surveillance equipment at a target area, configuring the equipment to record at least one transaction at the target area, and allowing the equipment to record and store at least one image or video file of the at least one recorded transaction in a storage component. At least one processor may further be provided and configured to communicate with the storage component. The at least one processor may be configured to filter the at least one image or video file to only images relevant to a transaction. The at least one processor may further be configured to categorize and tag the images according to transaction characteristics. The at least one processor may finally create a transaction data file according to the categorized images for comparison with recorded point of sale transaction data.

According to another exemplary embodiment, an image audit system may be provided. The image audit system may include video surveillance equipment configured to record at least one image or video file of a transaction. The image audit system may further include at least one computer for receiving the at least one image or video file from the video surveillance equipment. The computer may filter the image or video files based on recognition of a transaction into at least one relevant image and categorize and tag the at least one relevant image based on at least one transaction characteristic. The image audit system may further include network architecture coupling the video surveillance equipment and the at least one computer.

According to yet another exemplary embodiment, a non-transitory computer readable medium for creating a transaction record for auditing purposes may be provided. The non-transitory computer readable medium may include instructions to be executed on a processor. The instructions may cause video or image footage from video surveillance equipment to be received over a network. The instructions may further cause the footage to be filtered into at least one image relevant or contextual to a transaction. This may be determined through at least one of time grouping, background averaging, background subtraction, and image redundancy analysis. The instructions may further cause the at least one image to be categorized and tagged based on at least one of location and motion of an item in relation to a threshold between a server side and customer side of a target area, image recognition, and probability indexing. The instructions may finally cause the tagged relevant or contextual images of a transaction to be saved as a transaction data file for potential comparison to transaction records.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
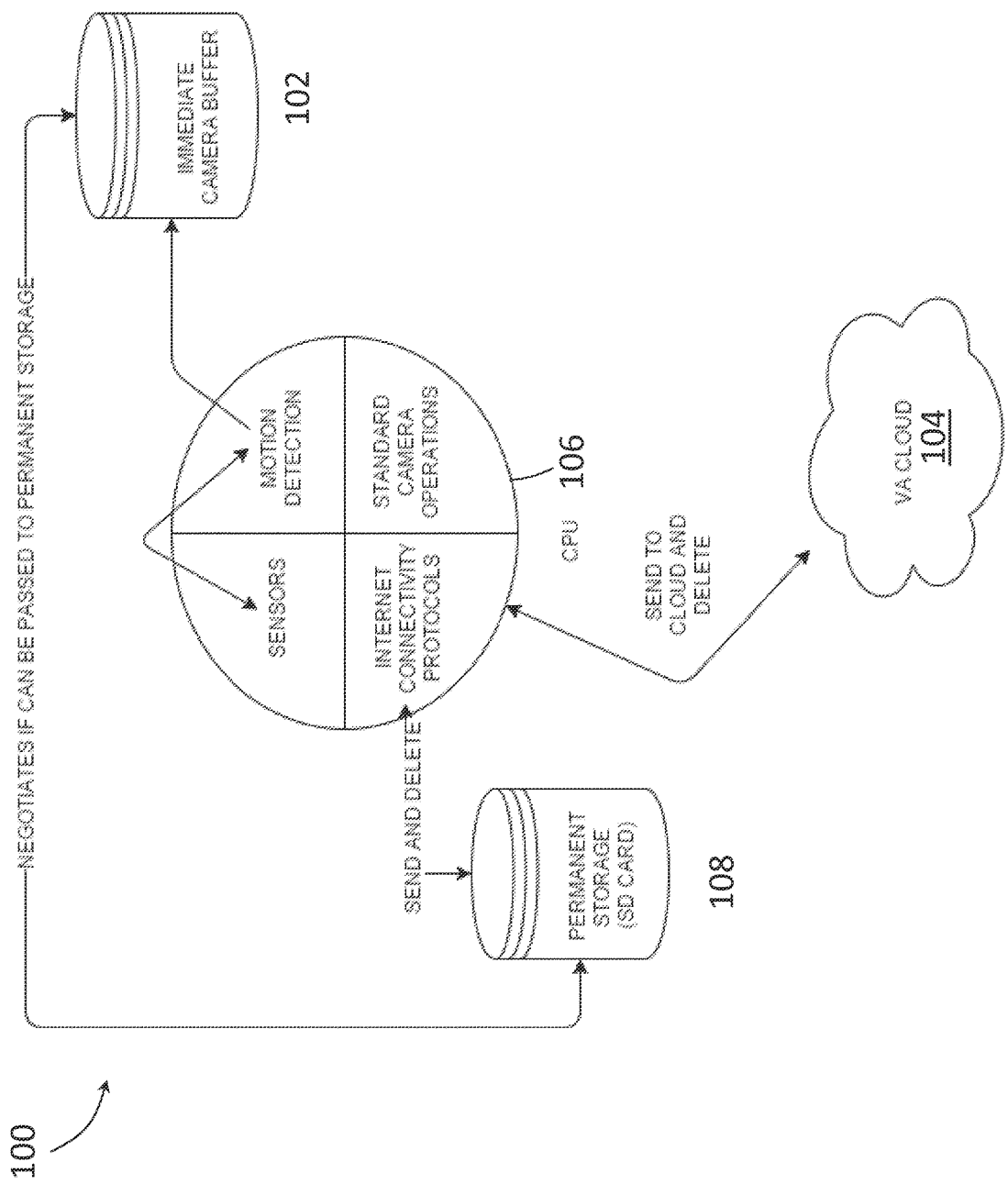
FIG. 1 may show an exemplary embodiment of a video surveillance system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to at least one exemplary embodiment, an image audit system may be disclosed. The image audit system may include a computing device that may be operated at a physical location such as a retail outlet, warehouse, commercial setting, university setting, office setting, or other physical location that may function as a point of sale. In alternative exemplary embodiments, the computing device may optionally be hosted off-site. In some exemplary embodiments, a combination of on-site and off-site computers may be utilized. The computing device may be a desktop computer, server, tablet, smart phone, or other similarly designed device. The image audit system may further include a surveillance system configured to record footage of a transaction. The footage may be recorded as video or image recording files, which may consist of video footage from multiple transactions or a single transaction. A transaction may be the sale of an item, movement of inventory, the opening or closing of an enclosed space, or serving related transactions. The surveillance system may have the capability to provide the recording file to the computing device.

Now referring to exemplary FIG. 1, an exemplary surveillance system 100 may include a camera sensor component. A camera may record footage to local storage 102 attached to the camera, to a local network device, or directly to a cloud server 104. An exemplary surveillance system computer 106 may optionally have a dual or quad core processor. In embodiments having multi-core processors, one core may be in charge of motion detection. This may allow for hyper sensitivity of motion around an interest area. If properly optimized, the same core may optionally be used to store the result of the motion detection in a specified location. Alternatively, a separate core may be used to store the result of the motion detection in a specified location, such as a direct buffer to FTP. In an exemplary embodiment, motion may trigger the system to save footage in the camera buffer 102 and pass the footage to a persistence-component 108. The persistence-component 108 may negotiate a network, send the footage, and confirm reception. If transmission is successful, the footage may be deleted from the buffer 102. If transmission fails, the send may be repeated at a set interval until the buffer can be dumped. The send retries may optionally be performed first-in, first-out. If remote-storage is not available and the local camera buffer is full, the system may start overwriting. The overwriting may optionally be performed first-in, first out. Any remaining cores may be used to perform standard surveillance camera functionality, such as, but not limited to, power, networking, time synchronization, alerts, and other functionality as would be understood by a person having ordinary skill in the art. Particular additional functionality may include scheduled call home functionality with auto-configuration. This may be performed at predetermined intervals, such as daily. A camera may, for example, send a scheduled message daily, which may be used as a monitoring ping to determine that the location is functioning properly and to ensure firmware is up-to-date. In an exemplary embodiment, the message may optionally be implemented as an HTTP request with a custom HTTP response. The HTTP response may let the camera know if it needs to download new settings or firmware. Configurable settings on a camera's web interface may be automatically set from an administration backend.

Exemplary camera sensors may include HD surveillance camera sensors. In some exemplary embodiments, these may include thermal or infrared sensors. Thermal or infrared functionality may be utilized for low light situations or for determining object characteristics, as discussed below. Cameras may be any suitable camera as would be understood by a person having ordinary skill in the art. In some exemplary embodiments, cameras may have a minimal profile to reduce intrusiveness and facilitate installation. In some further exemplary embodiments, the camera may be a camera system on chip, which may be connected to power in a strategic location and camera sensors may be connected via a cable.

Figure 2:
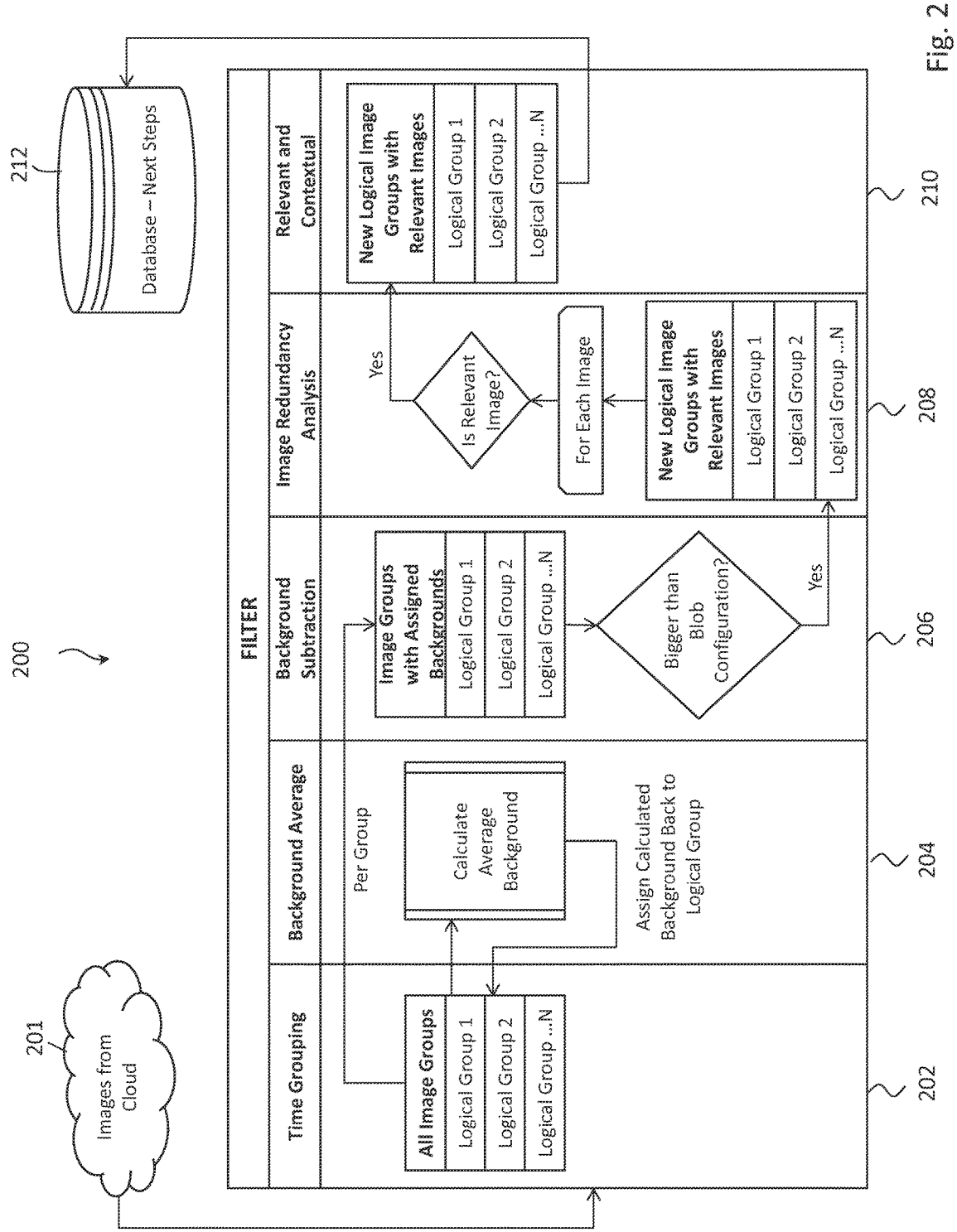
FIG. 2 may show an exemplary flow chart of the steps of an exemplary image audit process.
Figure 3:
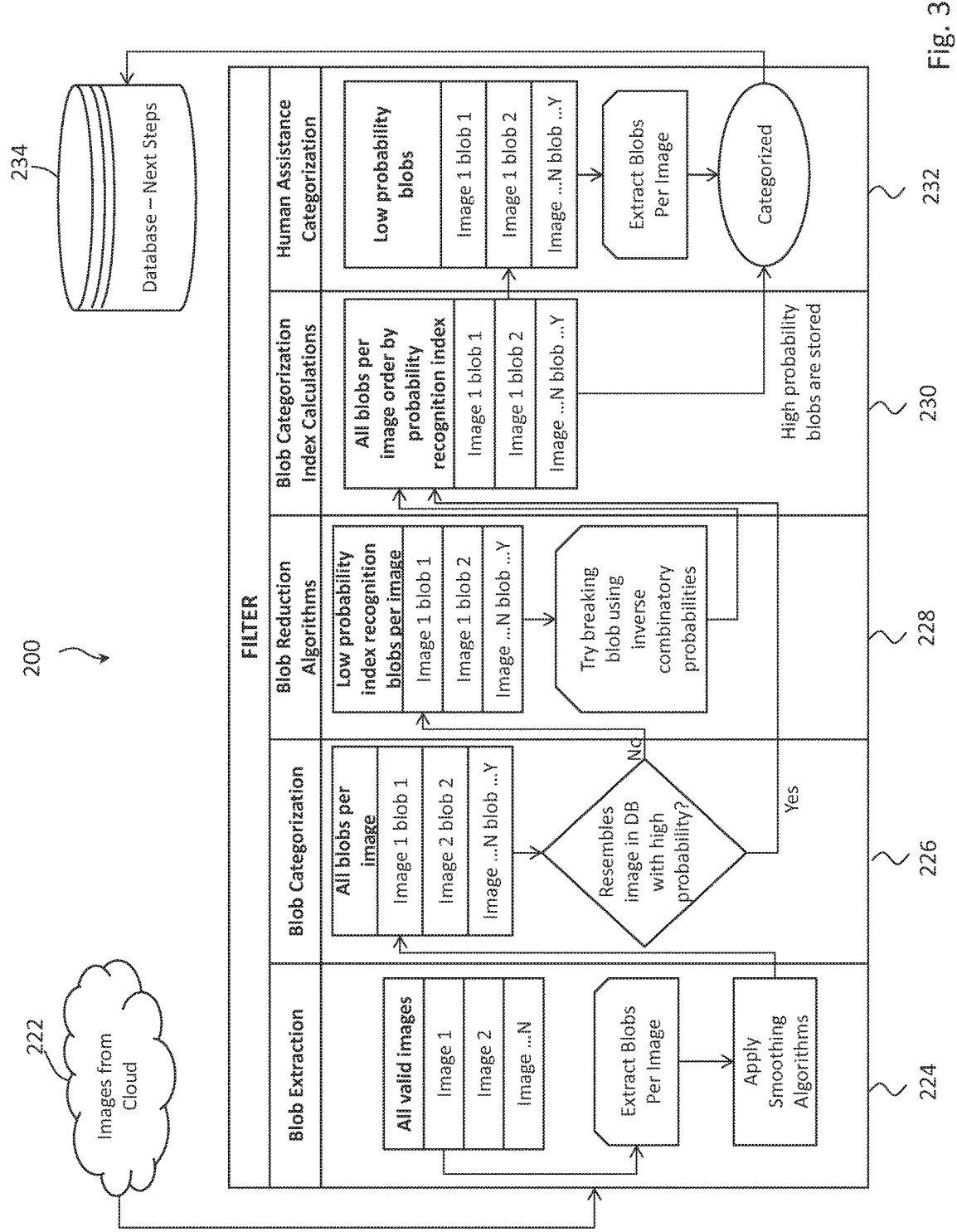
FIG. 3 may show an exemplary flow chart of the steps of an exemplary image audit process.

Now referring to exemplary FIGS. 2-3, at least one processor implemented in the surveillance system, on-site computer, or remote server may automatically filter or cull the footage into an image, or series of images, related to each transaction. The filter component in an exemplary embodiment may include a multi-step inference engine which may result in the reduction of non-relevant footage. The audit system may be strategically configured to facilitate the filtering of footage. The system may be configured by defining area of interest points. For example, this may include a counter area or point of sale. Once cameras are installed, a field of vision reference may be established. A field of vision reference may be established by providing an irregular quadrilateral, which may be used to calculate perspective of items. For example, two similar items on different ends of a counter or target area, one closer and one farther from a camera, may appear as having different sizes. A blob size percent may be established, which may serve as a threshold for observation. Anything below a pre-determined blob size percent of the interest points may be ignored. An employee side distinction may be configured. This may allow the filtering module to target motion initiated from an employee side of a target area. An employee/customer side distinction threshold may be configured such that the system distinguishes movement originated close to either side. The configuration may further establish a background learning rate. The background learning rate may set an amount of images the filtering module may use to make an inference, as would be understood by a person having ordinary skill in the art. The desired rate may vary with different environments, such as between fast paced locations and slower locations. Pre and post contextual images may also be configured. These images may not include recognition of a transaction, but may be used to provide context.

Once configured, an exemplary system may operate as follows. Surveillance footage may be accessed by a filter component 200 of a computer device. The images may be time grouped 202. Voids of time may be detected to determine distinct transactions. Footage files may be saved with a file name or metadata indicating a full date and time of the capture. This may be used to determine subsequent images. It may be inferred that even if images are similar in nature, too many seconds between the capture of the footage may indicate the footage should be treated as distinct transactions. Analysis of the footage may be performed to average or establish a baseline moving background 204. For example, all moving pixels for all images may be analyzed such that they create a composite moving background, which every image may then be compared to. If there is no change to the background for a large portion of footage, such as 200 images, and then there is a background change that is consistent over another large portion of footage, such as 400 images, two distinct composite backgrounds may be formed. The 200 image portion will then be compared to the composite background created from those 200 images and the 400 image portion will be compared to the composite background created from the 400 image portion of footage. This may provide context necessary for monitoring transactions.

Using the averaging results, the backgrounds and similarities of images or footage portions may be subtracted 206 to determine which images may be relevant for auditing purposes. The prior analysis may result in logical contextual groups with averages in subsequently calculated images. The reference moving background within a contextual group may be subtracted from each image. Once the background has been removed, the resulting image may be compared to the pre-established blob size percentage. If the resulting image is less than the configured blob size percentage, the whole image may be discarded, not deleted, as irrelevant for subsequent calculations. Discarded images may be retained for potential future use. The first image of a group may always be considered relevant and therefore may always be included in calculations despite the result of its background calculations.

The relevancy of the images may further be refined based on image redundancy analysis 208. The images within each resultant group from the prior steps of analysis may be compared for pixel variation. The analysis may determine if there is enough pixel variation between two images to warrant keeping both. The pixel variation may be a pre-configured threshold value. The first image of a group may remain relevant regardless of this analysis. In an exemplary embodiment, the image redundancy analysis may be performed as follows. Image 1 may be compared to Image 2, if Image 2 is not sufficiently similar, Image 2 may be discarded and Image 1 may then be compared with the next set of images until there is sufficient change in an image. The image having sufficient change may then become the reference image and the analysis may be repeated based on the new reference image. Each image not sufficiently different may be discarded, but not deleted, except for the first image of a group 210.

The relevant and contextual images may then be moved 212 to an analytics component from the filter component 200. Relevant images may include the images resultant of the previous steps and which also fall within the configured threshold distance to an employee side of a target area. Contextual images may include images immediately before and immediately after relevant images. Contextual images may have been previously discarded as irrelevant during the previous calculations and analysis. Once the analytics component confirms reception of the relevant and contextual images, the full footage file may be deleted and left in a running state until the next run of filtering.

In the image analytics and categorization component 220, the resultant images from the filtering engine may be received 222. Blobs, as defined above, may be extracted from the resultant images 224. The blobs may undergo desired processing to facilitate analysis, such as the application of a smoothing algorithm. Detected shapes in the images may be compared to a database including known shape data or other indicating characteristics to determine a type of item or transaction shown in the image. Images may be grouped into informal groups for analysis. An informal group may include every relevant image with its related contextual non-relevant images selected by the filtering component. In an exemplary embodiment, the image analytics and categorization component may analyze the images 226 as follows. Any pixel differences detected in the filtering component for an image may be compared to an image database. Common shapes associated with items may be detectable and categorized with a similarity probability index, which may be based on how similar the image is to the known database data. In scenarios where other elements may interfere with the detection of a common shape. An example may include a human element when an image shows the actual passing of an item being sold. In such an instance, the interfering element, such as the human element, may be detected through image recognition, as would be understood by a person having ordinary skill in the art. The interfering element may then be substantially eliminated and the remaining item shown in the image may be compared for categorization. Each categorized image may be given a probability index 228, which may indicate the probability of a match between the detected image and the known item database records. Each blob within an image may be given a probability index and may be ordered by probability index 230. The probability index may be related to a general type of item, such as a bottle of beer or bottle of wine. In some exemplary embodiments, a human may review 232 images and enter a determination into the system. The determination and the imagery upon which the determination was based may be added to the known reference database to be considered by the categorization component in subsequent runs. The resulting categorized data may establish a transaction data set 234, which may subsequently be used.

Figure 4:
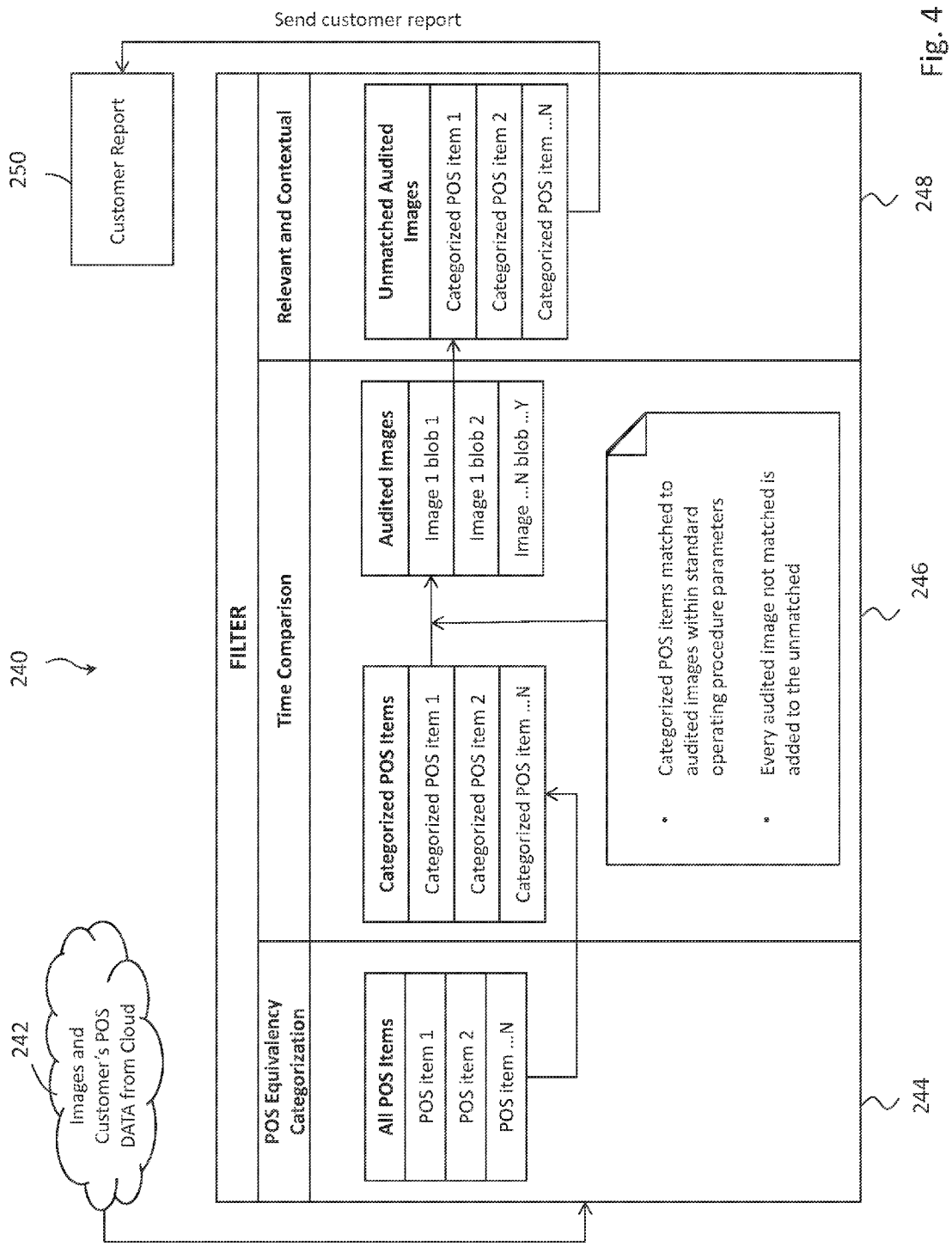
FIG. 4 may show an exemplary flow chart of the steps of an exemplary image audit process.

Now referring to exemplary FIG. 4, the auditing system may receive point of sale data from a customer in addition to the transaction data set 242, which may then be compared to the transaction data set by a matching component 240. The matching component may receive the point of sale data from a customer and compare it to resultant images and transaction data within the same date and time range from the analytics component. In an exemplary embodiment, point of sale data may be sent to the matching component over a network utilizing a POS interface. Point of sale data may include transaction characteristics, such as, but not limited to, POS item name, transaction date and time, POS revenue center, employee name or ID, and other relevant characteristics as would be understood by a person having ordinary skill in the art. It may be necessary for the POS transaction data to include an item identifier, such as a name, and a temporal identifier, such as the date and time. In embodiments where an item identifier is a name or numbers, these may be specific to a particular enterprise or may have distinct meanings for different enterprises. For example, a screwdriver may be a drink at restaurants and a tool at a hardware store. Therefore, an equivalency table may be generated to translate an enterprise's item identifications to a matching component acceptable identifier 244.

The matching component may compare the POS transaction data with the transaction image data 246. The transactions that are accounted for in both data sets may be eliminated. The comparison may utilize enterprise specific configurable standard operating procedures. For example, this may be used to regulate how long an employee has to register a transaction in a POS. Image transaction records that have not been eliminated due to a matching POS transaction record may indicate potential loss due to a failure to meet the standard operating procedure. This may include, for example, failure to process a transaction in a given time or at all. Relevant and contextual images for unmatched transactions may be flagged 248. The results may be compiled in a report 250, which may be sent to a customer enterprise. Reports may optionally be sent periodically, in real-time, or may be available on-demand. For example, a customer may be able to access a report via a web interface.

The categorization and comparison of transactions may include in depth characteristics of the transaction, such as the time, place, location, item type, item quantity, item weight, item color, item shape, and other relevant transaction characteristics such as the person overseeing the transaction. On the auditing system side, these characteristics may be determined by the surveillance system/computer, an auditing server, or a human auditor. If an item, person, or other transaction characteristic is not discernible from the footage, the surrounding footage may be scrolled through to account for the missing transaction characteristic. The categorization may be dependent upon the physical properties of the time, items, and persons involved in the transaction. The image files may be tagged based on the categorization. At least some of the specific characteristics of a transaction may also optionally be recorded at a POS and included in POS transaction data. These recorded characteristics may be utilized during the comparison. Known characteristics of an item may be accounted for by the matching component. For example, similar to the equivalency data, known item characteristics may be entered into the system, such that the known characteristic data may be tagged to a POS transaction identifying an item type. The matching component may check for recognition of similar transactions, including time, item type, quantity, and other characteristics discernible from the point of sale transaction data files. The matching component may flag and report anomalies between the image audit files and the POS transaction data files. For example, if a transaction recorded in the image audit files is not accounted for in the POS transaction files, it may be flagged and reported. Each flagged transaction may optionally undergo additional review, including review of surrounding transactions.

Figure 5:
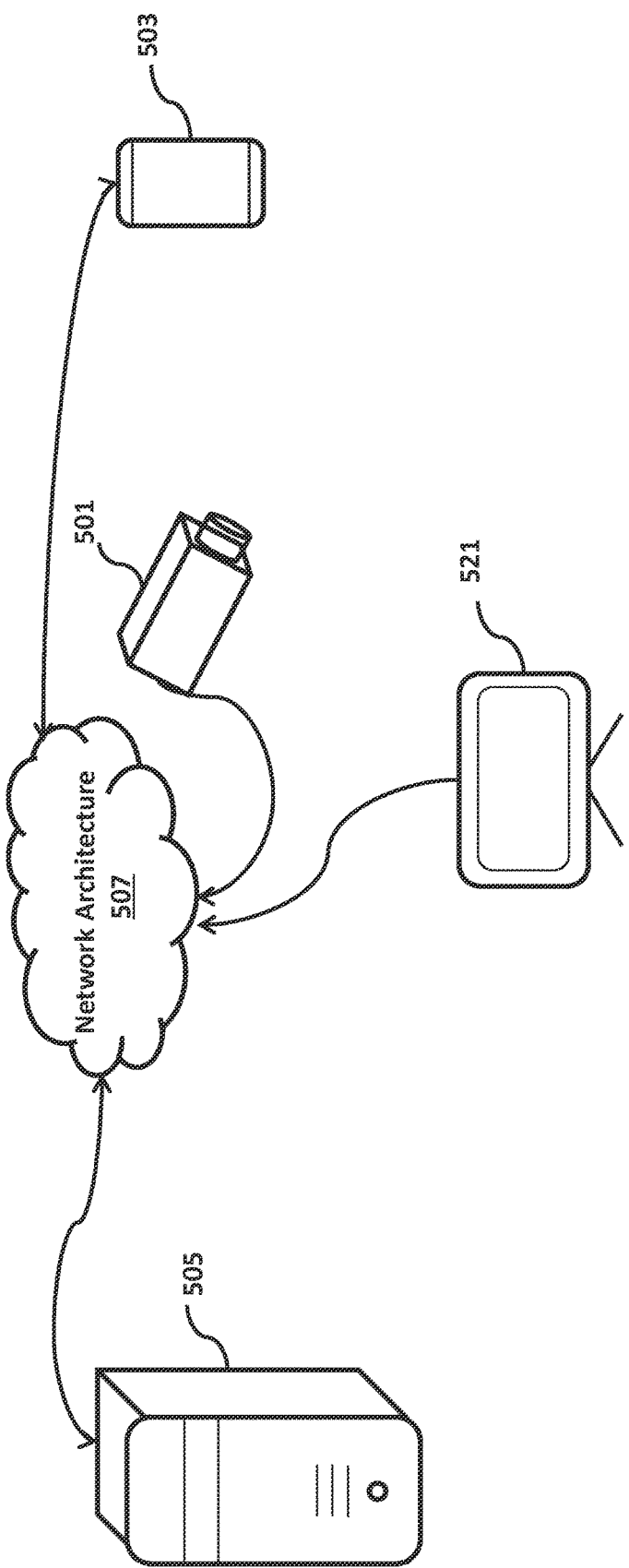
FIG. 5 may show the components of an exemplary image audit system.

Referring now to exemplary FIG. 5, the components of an exemplary embodiment of an image audit system may be disclosed. A computer 505, video surveillance system 501, and a point of sale device 503 may be shown. The video surveillance system 501 may include a video camera, night vision camera, infrared camera, thermal-infrared camera, motion sensing camera, a single frame camera, a multi frame camera, or any other similarly designed device as would be understood by a person having ordinary skill in the art. The video surveillance system 501 may consist of multiple video cameras in varying locations. The video surveillance system 501 may be configured to record video footage of a transaction relevant to a point of sale device. The video surveillance system 501 may record the location of the video footage. The location may be further specified by a global positioning system or altimeter. The location may be further specified to a building by floor zone and department. The video footage may be archived as a video database. The video database may record attributes such as but not limited to time and place. The video database may consist of a portion of the video footage or all of the video footage.

The video surveillance system may further include network architecture 507 to facilitate communication among a computer device 505, surveillance system 501, and point of sale device 503. The network architecture 507 may be a local area network or it may be a network capable of accessing the World Wide Web. Alternatively, communication may be provided manually by a flash drive, tape, DVD, or other similarly situated devices understood by a person having ordinary skill in the art. The computer 505 may have a network adapter to access the internet by wireless or wired connection. The computer 505 may be implemented in or configured to receive data from the surveillance system 501. In some embodiments, the computer 505 may optionally be an on-site device, may be a remote server, or a combination of both. The computer 505 may filter the video database into single or multiple images of a transaction. The computer 505 may categorize an image and assign certain desired characteristics. Exemplary inputs may include: the time, place, point of sale ID, person overseeing the transaction, item type, item number, item color, item shape, item contents, item value, and other inputs known to a person having ordinary skill in the art of point of sale devices and inputs. The categorization may be programmable such that any number of variable inputs may be used for specific applications.

Figure 6:
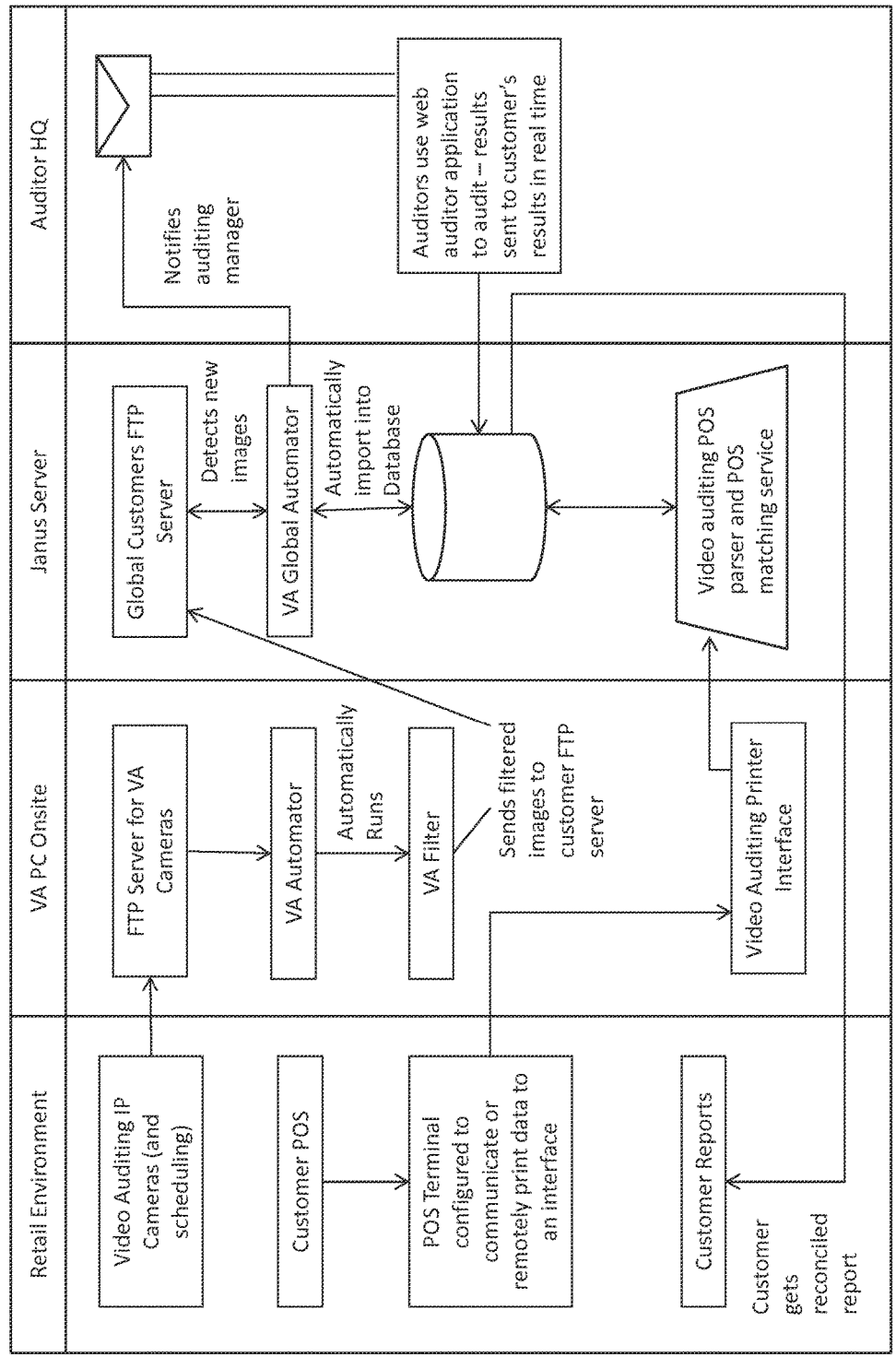
FIG. 6 may show an overview of the steps an image audit system may perform.

The point of sale device 503 may be a tablet, digital computer, cash register, touch screen, or application specific point of sale device. The point of sale device 503 may store the details of a transaction as a transaction data file. The transaction data file may store the location of a sale. The location may be further specified by a global positioning system or altimeter. The location may be further specified to a building by floor zone and department. The transaction data file may be transferred to the computer 505 across network architecture 507. The computer 505 may compare the transaction data file to the resultant inventory characteristics data file. For example, the comparison may consist of a conditional operation in which the item type and item quantity of the resultant inventory characteristics data file are compared against the item type and item quantity of the transaction data file. In some instances, a transaction data file may not exist at all. If the inputs of the inventory characteristics data file do not match a transaction data file, the computer 505 may report the discrepancies and differences. The report may be sent by email, SMS, Bluetooth or other communicatory capabilities, as would be understood by a person having ordinary skill in the art. As an example, the report may be sent by a text message or email, in real time, to a manager or security officer's mobile device that a discrepancy has been detected. The report functions may occur automatically or they may be produced at the request of an operator. The report may be accessed and viewed on a display device 521. The display device 521 may be an additional component of the digital computer 505 or it may be a monitor at an alternate location on or off site. FIG. 6 may show an exemplary flow chart of the above described auditing process 600.

Figure 7:
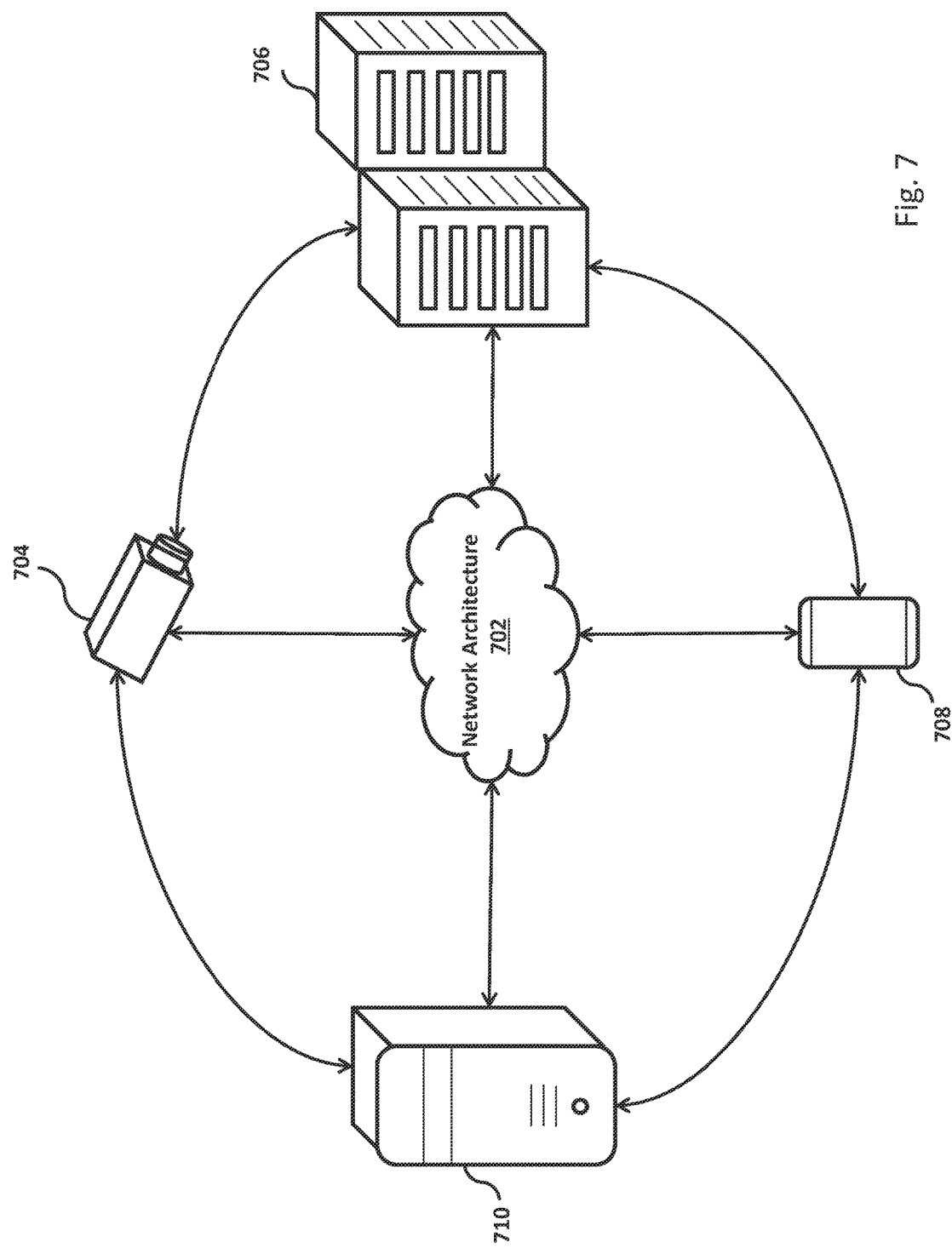
FIG. 7 may show the relationship of the components of an exemplary image audit system.

Referring generally to FIG. 7, an exemplary embodiment of the network architecture of an image audit system may be disclosed. The network architecture 702 may refer to the physical technological elements of a local area network such as Ethernet cables, network controller devices, coaxial connections, fiber optic connections, and other physical electronic wiring that may enjoin digital devices. The network architecture 702 may further refer to the physical technological elements such as a wireless controller, wireless access point, wireless repeater, wireless range extender, and other physical electronic technological elements that may be understood by a person having ordinary skill in the art to enjoin digital devices wirelessly. The network architecture 702 may also refer to an external utility operated network infrastructure such as Ethernet cables, fiber optic cables, coaxial cables, 3G, 4G, LTE, and other physical technological elements that a person having ordinary skill in the art would understand an internet service providing utility company may utilize. The network architecture 702 may use any unique combination of the aforementioned physical technological elements. The network architecture 702 may be used to enjoin devices of an exemplary video auditing system such as but not limited to: the video surveillance system 704, a server side digital computer 706, a point of sale device 708, and optionally a client side digital computer 710.

Figure 8:
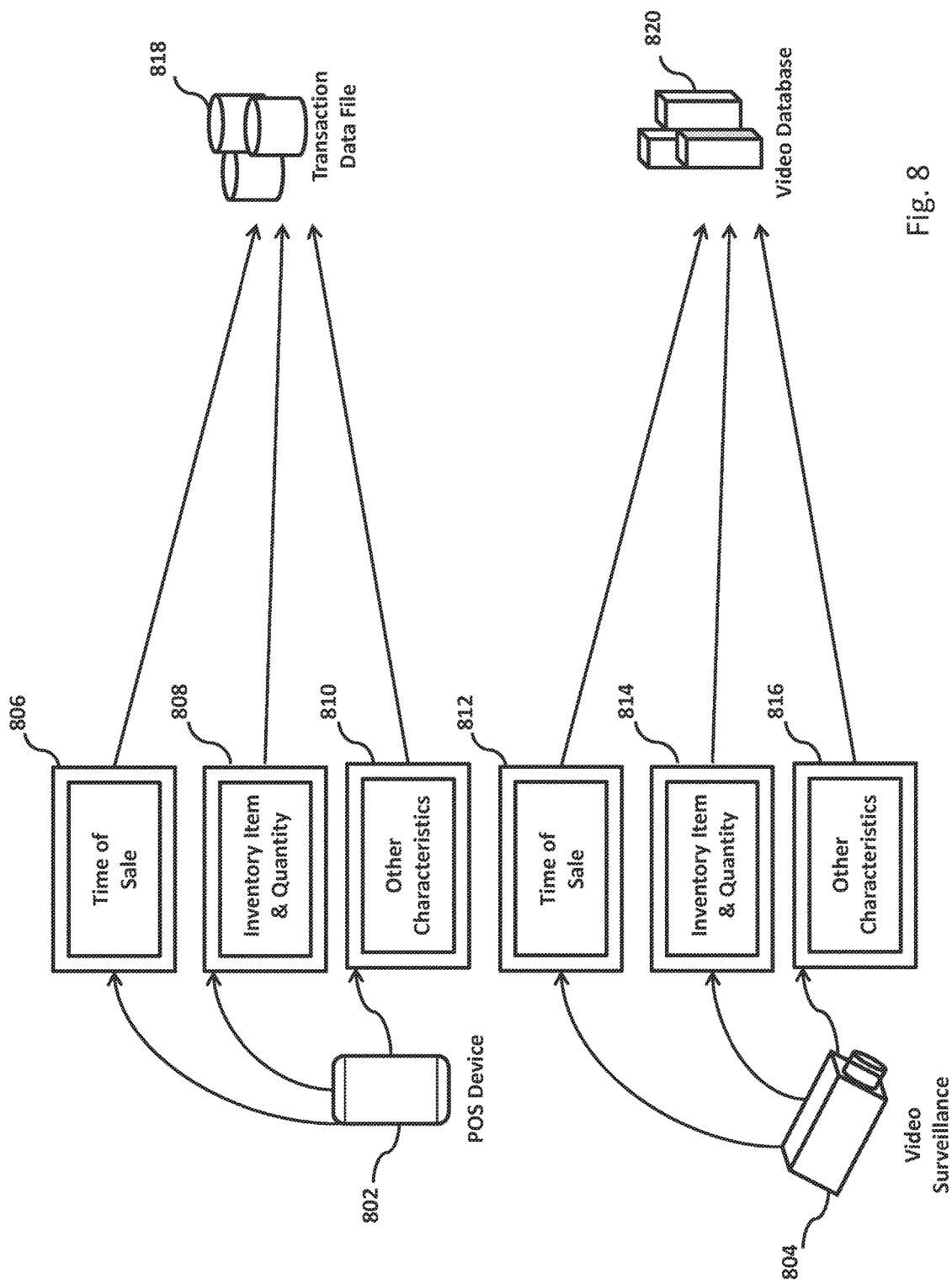
FIG. 8 may show exemplary characteristics or attributes recorded by the components image audit system.

Referring generally to FIG. 8 an exemplary embodiment of the characteristics or attributes recorded by a point of sale device 802 and a video surveillance device 804 of an image audit system may be disclosed. A point of sale device 802 may input characteristics that compose the varying elements of a transaction data file 818. The point of sale device 802 may input characteristics as would be understood to a person having ordinary skill in the art. Exemplary input characteristics may be the time of sale 806, inventory item and quantity 808, and other characteristics 810. Other characteristics may be recorded at a point of sale or tagged based on item type. Other characteristics may include the relative size, color, shape, price, weight, temperature, and other desired characteristics. The video surveillance system 804 may record footage of a transaction. The video surveillance system 804 may record footage of characteristics that compose the varying elements of a video database 820. The footage may be named according to, or have metadata showing, the time of the sale 812 and the location of the sale. The footage may show other transaction characteristics 816 such as an image of a customer, a storekeeper, a clerk, a security officer, and other physical attributes of the inventory item such as the relative size, color, shape, price, and weight. The video surveillance equipment may capture more video footage than is needed. A video database 820 may consist of segments of video footage on an as needed basis or it may consist of the entire bulk video footage aggregated over a time period. The footage may further be divided into distinct images. A computer or optionally a human auditor may filter or cull the bulk video footage to the video footage or image that may be relevant to a point of sale transaction, as described in detail above. In some embodiments, the video surveillance device 804, may be configured to only record video footage when a point of sale device is active or activated.

Figure 9:
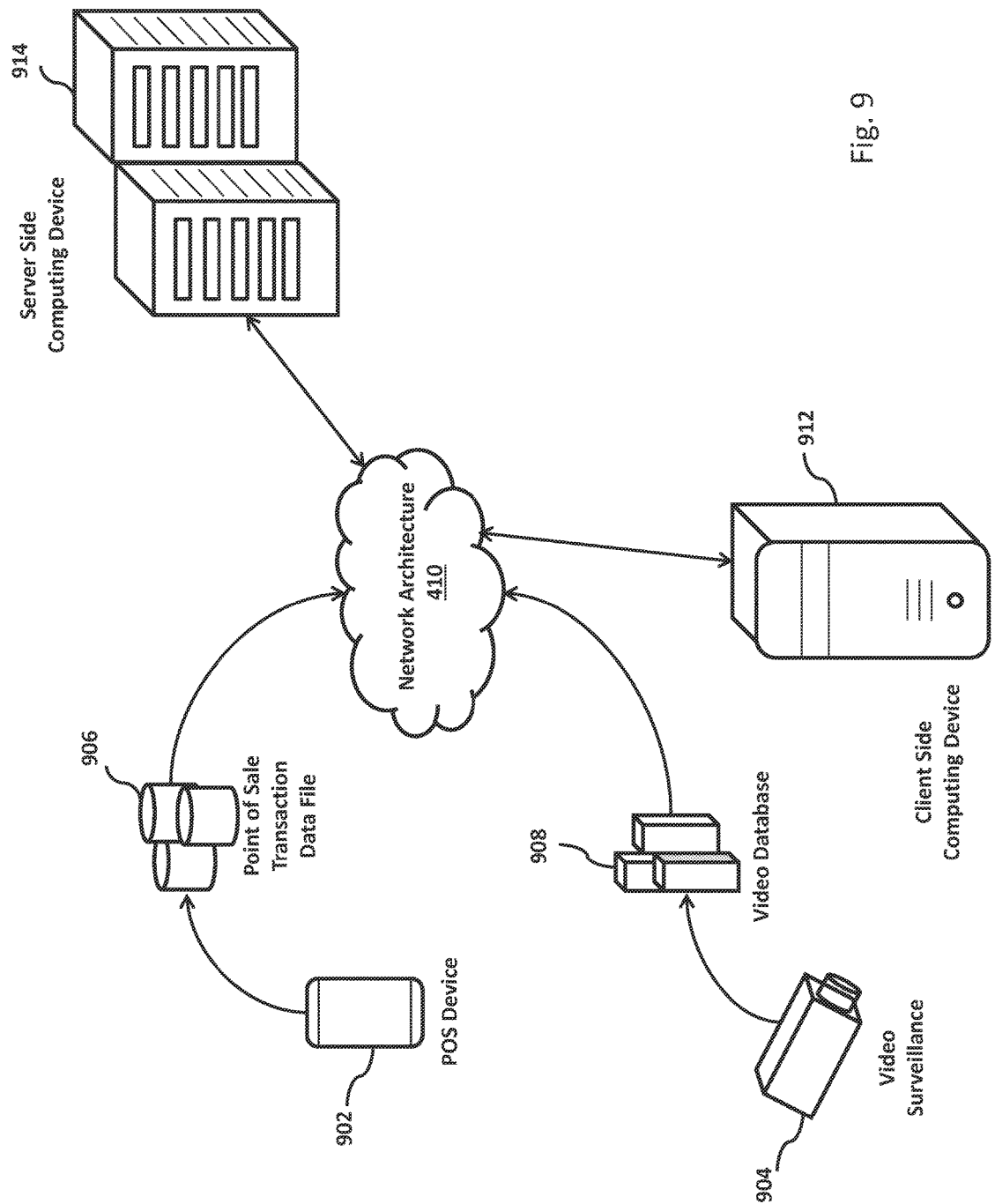
FIG. 9 may show the relationship of the components of an exemplary image audit system.

Referring generally to FIG. 9, an exemplary embodiment of client and server side computing devices of an image audit system may be disclosed. A point of sale device 902 may transfer a transaction data file 906 across network architecture 910. The transaction data file 906 may be transferred to a client side computing device 912, a server side computing device 914, or both. A video surveillance system 904 may transfer a video database 908 across network architecture 910. The video database may be transferred to a client side computing device 912, a server side computing device 914, or both. The server side computing device 914, may perform additional manipulation of the video database 908, the transaction data file 906, or both. In some alternatively exemplary embodiments, the client side computing device 912 may optionally be a component of the video surveillance system 904. In yet further exemplary embodiments, there may optionally be no client side computing device 912. The server side computing device 914 or client side computing device 912 may filter the video database into a discrete image or a series of discrete images correlating to the time and place a transaction may have occurred. The point of sale device 902 and the video surveillance device 904 may be time synchronized such that the time recordation of a point of sale transaction and the time recordation of the video footage of a transaction would be substantially identical. The synchronization may be used as a basis for the comparison of transaction records. The transaction data file may also be filtered so that the as needed information may be utilized more efficiently.

The video database, or the resultant image or images as previously explained, may be categorized according to attributes of the transaction. Attributes may include inventory characteristics of the merchandise or goods of the point of sale transaction or the attributes may include other characteristics surrounding the person or persons involved with the transaction. The inventory characteristics may report the serving or selling of items that may not have transaction identification for a point of sale device. The attributes may include customer information, storekeeper information, clerk information, security officer on duty information, and other physical attributes of the inventory item such as the relative size, color, shape, price, and weight. The categorization may include the categorization of a transaction data file. The transaction data file may be beneficial to categorize so that system resources can be allocated effectively and efficiently. For example, a transaction data file may contain information that a transaction was voided, a return was made, an unorthodox quantity of items were sold, a discount was applied, a storekeeper or salesperson oversaw the sale, or other occurrences that would likely warrant further investigation. The system may be programmed to categorize automatically or with the assistance of a human operator.

The categorization may create an inventory characteristics data file. The system may be custom programmed to recognize and categorize observations based on specific industry requirements, custom situations, or by a standard operating procedure. Further to the above description, the filtering and categorizing of footage may optionally include image recognition, facial recognition, pattern recognition, digital watermark recognition, three-dimensional image recognition, and other image recognition configurations that would be understood by a person having ordinary skill in the art of image recognition. Pattern recognition, may include the categorization of a label to a given input value. Pattern recognition may include algorithms that generally aim to provide a reasonable attribute or categorization of all possible attributes and to perform a "most likely" match of the inputs. Pattern recognition may take into account the statistical variation of the "most likely" determination and apprise the input of a probability assessment in addition to classifying the input. The server side computing device 914 may compare the transaction data file 906 and the inventory characteristics data file, as referenced above. Additional comparison may be performed when the standard operating procedure may have not been adhered to or other occurrences that may warrant additional review.

The server side computing device 914 may report the detailed comparison. The report may include instances in which the standard operating procedure was breached, modified, or unknown and non-calculable issues may have occurred. As an exemplary hypothetical, the report may include instances in which the inventory characteristic data file indicated that three items were sold and the transaction data file indicated that two items were sold. In this instance, the report would flag the transaction for further review. The report may additionally compile the footage from the video database 908 and the original point of sale transaction data file 906, for additional review. The report may optionally go through additional rounds of verification in which statistical probabilities are assigned to the categorization and comparison. The report may be transferred or accessed through the network architecture 910 to a client. The client may receive or access the report as desired, such as through a client side computing device, a mobile device of a store manager, clerk, security officer, etc. In some embodiments, the report may be sent or accessed in real time, directly after the transaction is completed or upon the initial detection of an anomaly. The real time reporting may apprise store clerks and security officers at the exit of a building to perform an additional verification of the physical goods. The report may contain alerting features which may, in some instances, warrant a report and an ensuing immediate alert while other instances may not. The report may be allocated to specific recipients that may be dependent upon the severity of the alert or the accuracy of the statistical analysis.

Figure 10:
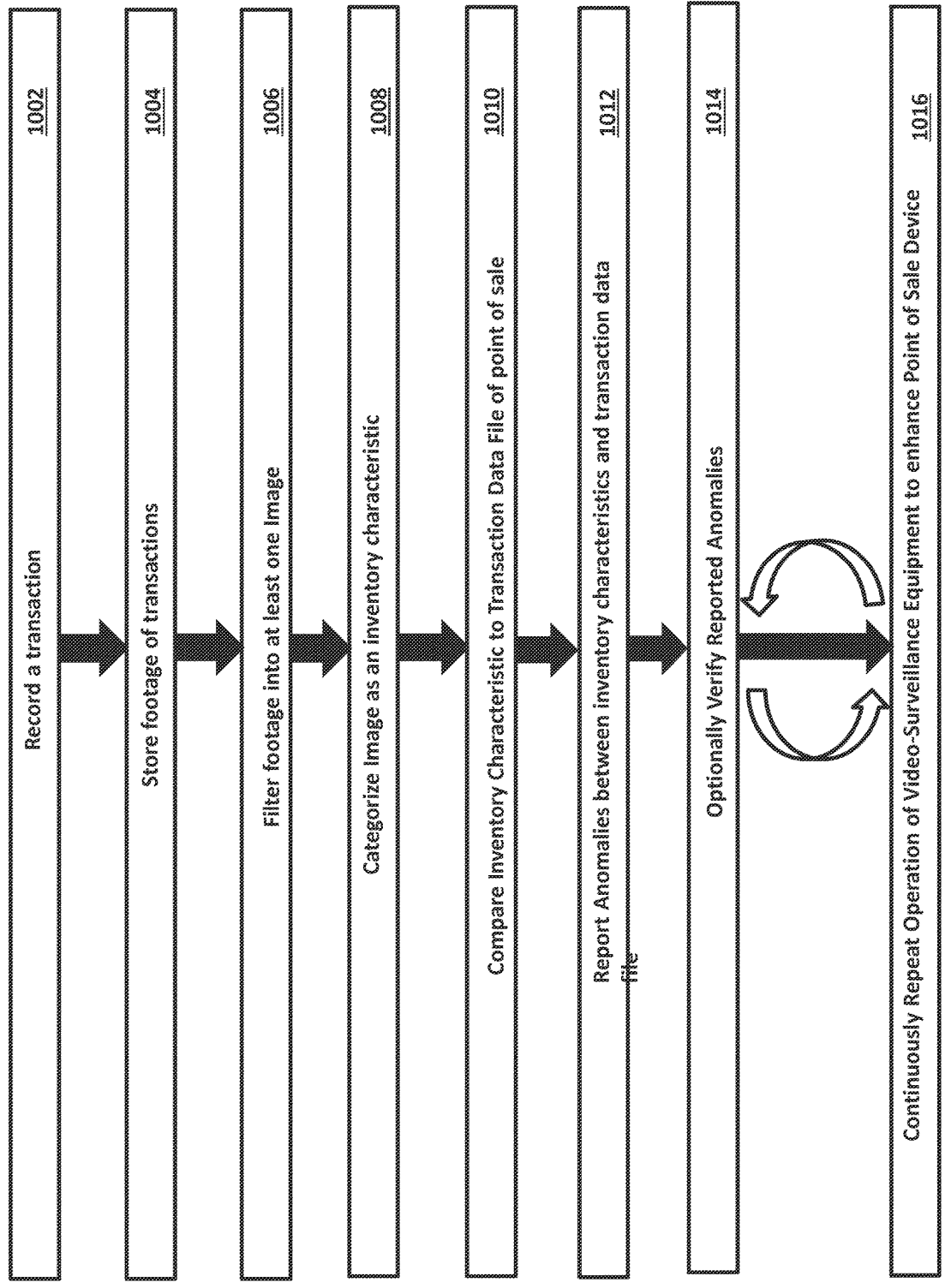
FIG. 10 may show the steps of an exemplary image audit process.

Referring generally to FIG. 10, an exemplary image auditing process may be shown. Video surveillance equipment may record a transaction 1002. Footage of a transaction or transactions may be stored for processing 1004. The footage may be filtered to include only relevant portions of transactions 1006, as described in further detail above. In some embodiments, the footage may be duplicated so that an unedited original copy may be referenced at a later point in time. The transactions shown in the filtered footage may then be categorized 1008, as detailed above. The categorization of a transaction may consist of substantially similar information to that which would be found in a point of sale transaction data file. Next, the inventory characteristic data file may be compared 1010 to the transaction data file of a point of sale device. Next, any anomalies between inventory characteristics and the transaction data file may be reported 1012. The report may occur in real time, periodically, or on-demand. The report may be stored and accessed at a later time. Next, the optional step of verification of the reported anomalies 1014 may occur. The verification 1014 may rely on a desired level of statistical certainty as discussed previously. The verification 1014 may alternatively be set to no statistical certainty required in which all anomalies may be reported 1012. Finally, the aforementioned steps may be repeated as desired 1016.

In some further potential applications, recorded characteristics of a transaction may be compared with pre-configured standard operating procedures set by a client. For example, thermal or color characteristic data may be used to determine an item quality. Therefore, if an item in a transaction does not meet a pre-configured standard operating procedure indicating a threshold temperature, for example, it may be flagged. Standard operating procedures may further include dress, timeliness, and other quality control aspects of a transaction. Other desired item characteristics or procedures may be similarly audited, as would be understood by a person having ordinary skill in the art.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of auditing transactions with video surveillance, comprising:
   providing video surveillance equipment at a point of sale;
   configuring the video surveillance equipment to record and store at least one image or video file comprising at least one recorded transaction in a storage component;
   providing at least one processor configured to communicate with the storage component, wherein the at least one processor filters the at least one image or video file into a files comprising only images relevant or contextual to a transaction by grouping the original footage based on time and background, averaging the background for a group, subtracting the background, analyzing the resultant pixels for compliance with a threshold, discarding redundant images based on pixel analysis, and retrieving discarded images that are contextual to a transaction;
   configuring the at least one processor to categorize and tag the images relevant and contextual to a transaction according to transaction characteristics; and
   configuring the at least one processor to create a transaction data file according to the categorized images for comparison with recorded point of sale transaction data.

2. The method of claim 1, wherein images relevant to a transaction are further determined by monitoring the location and motion of an item in reference to a server side and customer side of a threshold.

3. The method of claim 2, wherein images contextual to a transaction comprise images that are first in a group, last in a group, or immediately preceding or following an image relevant to a transaction.

4. The method of claim 2, wherein the processor is further configured to use image and pattern recognition in the filtering and categorizing of images.

5. The method of claim 4, further comprising configuring the filtering and categorizing of images to assign a probability index based on image recognition results.

6. The method of claim 1, further comprising allowing a point of sale transaction record to be compared to the transaction data file by a matching component implemented through the at least one processor.

7. The method of claim 6, further comprising allowing the matching component to flag any discrepancies between the point of sale transaction record and the transaction data file and configuring the matching component to generate a report of any discrepancies.

8. A non-transitory computer readable medium for creating a transaction record for auditing purposes, comprising instructions stored thereon, that when executed on a processor, perform the steps of:

receiving video or image footage from video surveillance equipment over a network;

filtering the footage into at least one image relevant or contextual to a transaction, as determined through at least one of location and motion of an item in relation to a threshold between a server side and customer side of a target area, time grouping, background averaging, background subtraction, and image redundancy analysis;

categorizing and tagging the at least one image based on at least one of image recognition and probability indexing;

saving the tagged relevant or contextual images of a transaction as a transaction data file for potential comparison to transaction records.

9. The non-transitory computer readable medium for creating a transaction record for auditing purposes of claim 8, further comprising instructions stored thereon, that when executed on a processor, perform the steps of receiving transaction records over a network from a point of sale device, and comparing the transaction records from the point of sale device with the transaction data file.

10. The non-transitory computer readable medium for creating a transaction record for auditing purposes of claim 8, wherein background averaging further comprises organizing images into groups having similar backgrounds and comparing pixels of images within the same group against a composite moving background for that group.

11. The non-transitory computer readable medium for creating a transaction record for auditing purposes of claim 8, wherein an image contextual to a transaction comprises images surrounding images showing a transaction.

* * * * *